US008279153B2

(12) United States Patent
Song et al.

(10) Patent No.: US 8,279,153 B2
(45) Date of Patent: Oct. 2, 2012

(54) LIQUID CRYSTAL DISPLAY TO INCREASE DISPLAY QUALITY BY PREVENTING DC IMAGE STICKING, FLICKER AND STAINS

(75) Inventors: Hongsung Song, Gumi-si (KR); Woongki Min, Daegu (KR); Yonggi Son, Milyang-si (KR); Suhyuk Jang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 757 days.

(21) Appl. No.: 12/277,132

(22) Filed: Nov. 24, 2008

(65) Prior Publication Data

US 2009/0167664 A1 Jul. 2, 2009

(30) Foreign Application Priority Data

Dec. 29, 2007 (KR) ........................ 10-2007-0141118

(51) Int. Cl.
*G09G 3/18* (2006.01)
*G09G 3/36* (2006.01)
*G09G 5/00* (2006.01)
*G06F 3/038* (2006.01)

(52) U.S. Cl. ................ 345/94; 345/50; 345/53; 345/54; 345/55; 345/87; 345/95; 345/96; 345/98; 345/99; 345/100; 345/204; 345/209

(58) Field of Classification Search ..................... 345/94
See application file for complete search history.

(56) References Cited

U.S. PATENT DOCUMENTS

| | | | | |
|---|---|---|---|---|
| 6,075,505 | A * | 6/2000 | Shiba et al. | 345/87 |
| 7,030,843 | B2 * | 4/2006 | Youn | 345/86 |
| 7,142,203 | B2 * | 11/2006 | Hiroki et al. | 345/209 |
| 2003/0189537 | A1 * | 10/2003 | Yun | 345/87 |
| 2004/0178981 | A1 * | 9/2004 | Asada et al. | 345/96 |
| 2004/0263466 | A1 * | 12/2004 | Song et al. | 345/100 |
| 2005/0093806 | A1 * | 5/2005 | Hosotani | 345/96 |
| 2005/0231455 | A1 * | 10/2005 | Moon | 345/89 |
| 2008/0158128 | A1 * | 7/2008 | Feng | 345/96 |

* cited by examiner

*Primary Examiner* — Alexander S Beck
*Assistant Examiner* — Karin Kiyabu
(74) *Attorney, Agent, or Firm* — Birch, Stewart, Kolasch & Birch, LLP

(57) ABSTRACT

A liquid crystal display and a method for driving the same are disclosed. The liquid crystal display includes a timing controller generating a polarity control signal. A logic inverting period of the polarity control signal during frame periods ranging from an Nth frame period among M frame periods to 2 to 4 frame periods following the Nth frame period is longer than a logic inverting period of the polarity control signal in the other frame periods, where N is an integer equal to or larger than 4 and M is larger than N. The liquid crystal cells in one frame period of the M frame periods are charged to the data voltage whose a polarity is opposite to a polarity of the data voltage in a previous frame period of one frame period.

7 Claims, 17 Drawing Sheets

FIG. 5

| Frame | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| POL | + | - | + | - | + | - | + | + | - | + | - | + | - | + | - | - | + | - | + | - | + | - | + | + | - | + | - | + | - | + |

| Frame | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|
| POL | - | - | + | - | + | - | + | - | + | + | - | + | - | + | - | + | - | - |

LIQUID CRYSTAL DISPLAY TO INCREASE DISPLAY QUALITY BY PREVENTING DC IMAGE STICKING, FLICKER AND STAINS

This application claims the benefit of Korea Patent Application No. 10-2007-0141118 filed on Dec. 29, 2007, which is hereby incorporated by reference for all purposes as if fully set forth herein.

BACKGROUND OF THE INVENTION

1. Field of the Invention

Exemplary embodiments of the invention relate to a liquid crystal display and a method for driving the same. Although the exemplary embodiments of the invention are suitable for a wide scope of applications, they are particularly suitable for preventing direct current (DC) image sticking, flicker, and stains so as to increase the display quality.

2. Discussion of the Related Art

Active matrix type liquid crystal displays display a moving picture using a thin film transistor (TFT) as a switching element. The active matrix type liquid crystal displays have been implemented televisions as well as display devices in portable devices, such as office equipment and computers, because of the thin profile of the active matrix type liquid crystal displays. Accordingly, cathode ray tubes (CRT) are being rapidly replaced by the active matrix type liquid crystal displays.

Because a liquid crystal display shown in FIG. 1 switches a data voltage supplied to liquid crystal cells Clc using a thin film transistor TFT formed in each liquid crystal cell Clc to actively control data, the quality of a moving picture can increase. In FIG. 1, Cst indicates a storage capacitor for holding the data voltage charged to the liquid crystal cell Clc. DL indicates a data line to which the data voltage is supplied. GL indicates a scan line to which a scan voltage is supplied.

The liquid crystal display is driven in an inversion manner in which a polarity of the liquid crystal cells Clc is inverted between the neighboring liquid crystal cells Clc and the polarity is inverted every one frame period, so as to reduce direct current (DC) offset components and to reduce the degradation of a liquid crystal. If the data voltage with a predetermined polarity is dominantly supplied to the liquid crystal cell Clc for a long time, image sticking may occur. The image sticking is called direct current (DC) image sticking because the liquid crystal cells Clc are repeatedly charged to a voltage with the same polarity. For instance, in case the data voltage is supplied to the liquid crystal display in an interlaced manner, the DC image sticking occurs. In the interlaced manner, the data voltage is supplied to the liquid crystal cells of odd-numbered horizontal lines during odd-numbered frame periods, and the data voltage is supplied to the liquid crystal cells of even-numbered horizontal lines during even-numbered frame periods.

FIG. 2 is a waveform diagram showing an example of the data voltage supplied to the liquid crystal cell Clc in the interlaced manner. In FIG. 2, it is assumed that the liquid crystal cells Clc to which the data voltage is supplied are positioned on odd-numbered horizontal lines.

As shown in FIG. 2, a positive polarity data voltage is supplied to the liquid crystal cells Clc during odd-numbered frame periods, and a negative polarity data voltage is supplied to the liquid crystal cells Clc during even-numbered frame periods. In the interlaced manner, a high data voltage of a positive polarity is supplied to the liquid crystal cells Clc of the odd-numbered horizontal lines during only the odd-numbered frame periods. Therefore, as can be seen from a waveform in a box area of FIG. 2, the positive polarity data voltage is supplied more dominantly than the negative polarity data voltage in 4 frame periods, and thus the DC image sticking appears.

FIG. 3 shows a screen of an experimental result of the DC image sticking appearing by interlaced data. If an original image shown in a left side of FIG. 3 is supplied to the liquid crystal display for a certain time in the interlaced manner, the data voltage, whose a polarity changes in each frame period, noticeably changes depending on the odd-numbered frame periods and the even-numbered frame periods as shown in FIG. 2. As a result, if after the supply of the original image, a data voltage with a middle gray level, for example, 127 gray levels is supplied to all the liquid crystal cells Clc of a liquid crystal display panel, the original image is blurrily displayed on the screen as in an image shown in a right side of FIG. 3. The image shown in the right side of FIG. 3 is the DC image sticking.

As another example of the DC image sticking, if the same image is moved or scrolled at a constant speed, voltages of the same polarity are repeatedly accumulated on the liquid crystal cell Clc depending on a relationship between the size of a scrolled picture and a scrolling speed (moving speed). Hence, the DC image sticking may appear. Another example of the DC image sticking is shown in FIG. 4. FIG. 4 shows a screen of an experimental result of the DC image sticking appearing when an oblique line pattern and a character pattern are moved at a certain speed.

The display quality of the liquid crystal display is reduced by a flicker phenomenon as well as the DC image sticking. The flicker phenomenon means a luminances difference that can be periodically observed with the naked eye. Accordingly, the DC image sticking and the flicker phenomenon have to be simultaneously prevented so as to improve the display quality of the liquid crystal display.

Stains may appear on the display screen of the liquid crystal display. If a DC voltage of the same polarity is applied to a liquid crystal layer for a long time, impurity ions in the liquid crystal layer are separated depending on a polarity of the liquid crystal. Further, ions with different polarities are respectively accumulated on a pixel electrode and a common electrode inside the liquid crystal cells. If a DC voltage is applied to the liquid crystal layer for a long time, the amount of accumulated ions increases. Hence, an alignment layer is degraded and alignment characteristics of the liquid crystal are degraded. In other words, the application of the DC voltage to the liquid crystal display for the long time may cause stains on the display screen. The development of a liquid crystal material with a low dielectric constant or a method for improving an alignment material or an alignment method have been attempted so as to solve the stain problem. However, it takes a long time and a heavy expense to develop a material used in the method. The use of the liquid crystal material with the low permittivity may reduce the drive characteristics of the liquid crystal. According to the experimental findings, as the amount of impurities ionized inside the liquid crystal layer increases and an acceleration factor becomes large, a time when the stains are revealed becomes rapider. The acceleration factor may include a temperature, time, DC drive of the liquid crystal, and the like. Accordingly, the stains may worsen at a high temperature or when the DC voltage of the same polarity is applied to the liquid crystal layer for the long time. Because the stains non-uniformly appear between panels manufactured through the same manufacture line, the stain problem cannot be solved only the development of new material or an improvement method of process. A method for suppressing the DC drive of the liquid crystal is effective in solving the stain problem.

SUMMARY OF THE INVENTION

Accordingly, exemplary embodiments of the invention provide a liquid crystal display and a method for driving the same capable of preventing DC image sticking, flicker, and stains so as to increase the display quality.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, a liquid crystal display comprises a liquid crystal display panel including a plurality of data lines, a plurality of gate lines crossing the data lines, and a plurality of liquid crystal cells, a data drive circuit that inverts a polarity of a data voltage supplied to the data lines in response to a polarity control signal, a gate drive circuit that supplies a gate pulse to the gate lines, and a timing controller that generates the polarity control signal and controls the data drive circuit and the gate drive circuit, wherein a logic inverting period of the polarity control signal during frame periods ranging from an Nth frame period among M frame periods to 2 to 4 frame periods following the Nth frame period is longer than a logic inverting period of the polarity control signal in the other frame periods, where N is an integer equal to or larger than 4 and M is larger than N.

The liquid crystal cells in one frame period of the M frame periods is charged to the data voltage whose a polarity is opposite to a polarity of the data voltage in a previous frame period of one frame period, and the liquid crystal cells are time-divided into a plurality of liquid crystal cell groups during the frame periods ranging from the Nth frame period to 2 to 4 frame periods following the Nth frame period, and the liquid crystal cells belonging to each of the plurality of liquid crystal cell groups are charged to the data voltage with the same polarity during the two neighboring frame periods among the frame periods ranging from the Nth frame period to 2 to 4 frame periods following the Nth frame period.

In another aspect, a method of driving a liquid crystal display including a liquid crystal display panel including a plurality of data lines, a plurality of gate lines crossing the data lines, and a plurality of liquid crystal cells, a data drive circuit that inverts a polarity of a data voltage supplied to the data lines in response to a polarity control signal, a gate drive circuit that supplies a gate pulse to the gate lines, and a timing controller that generates the polarity control signal and controls the data drive circuit and the gate drive circuit, the method comprises allowing a logic inverting period of the polarity control signal during frame periods ranging from an Nth frame period among M frame periods to 2 to 4 frame periods following the Nth frame period to be longer than a logic inverting period of the polarity control signal in the other frame periods, where N is an integer equal to or larger than 4 and M is larger than N.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

FIG. 5 is a diagram for explaining a principal in which DC image sticking does not appear in scrolling data when a method for driving a liquid crystal display according to an exemplary embodiment of the invention is applied;

DETAILED DESCRIPTION OF THE ILLUSTRATED EMBODIMENTS

Hereinafter, an exemplary embodiment will be described in detail with reference to FIGS. 5 to 17.

FIGS. 5 to 8 are diagrams for explaining a principal in which direct current (DC) image sticking is suppressed in a liquid crystal display according to an exemplary embodiment of the invention.

The exemplary embodiment of the invention inverts a polarity of a data voltage in each frame period in scrolling data moving symbols or characters at 8-pixel speed in each frame period using a polarity control signal POL for controlling a polarity of a data voltage output from a data drive circuit, and controls the polarity of the data voltage in an N-th (where N is an integer equal to or larger than 4) frame period every M (where M is larger than N) frame periods to be the same as the polarity of the data voltage in a previous frame period of the N-th frame period. For instance, as shown in FIG. 5, liquid crystal cells are charged to data voltages of symbol or character in frame periods indicated by oblique lines in FIG. 5. Polarities of the data voltages changes to "++", "−−", "++" and "−−" in octuple-numbered frame periods and previous frame periods. Accordingly, the exemplary embodiment of the invention periodically inverts a polarity of a voltage charged to the liquid crystal cells in scrolling data moving symbols or characters at a certain speed to suppress DC image sticking appearing by the accumulation of the data voltages with the same polarity and DC drive of a liquid crystal, thereby preventing the appearance of stains.

Figure 1:
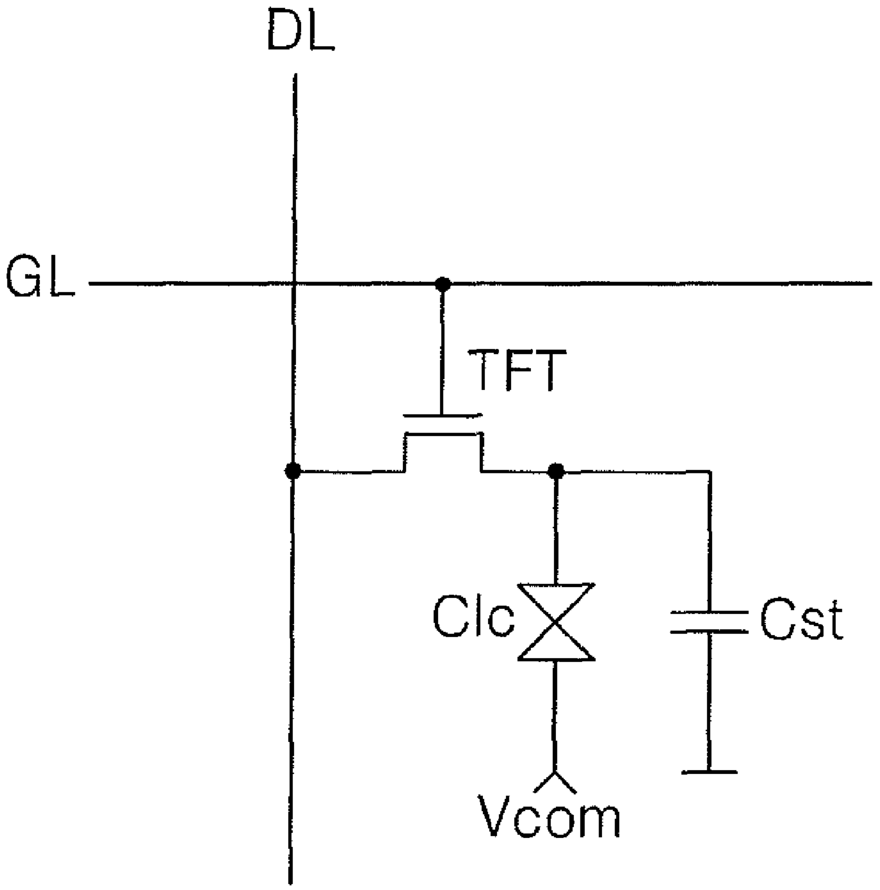
FIG. 1 (Prior Art)
FIG. 1 is an equivalent circuit diagram showing a liquid crystal cell of a liquid crystal display.
Figure 2:
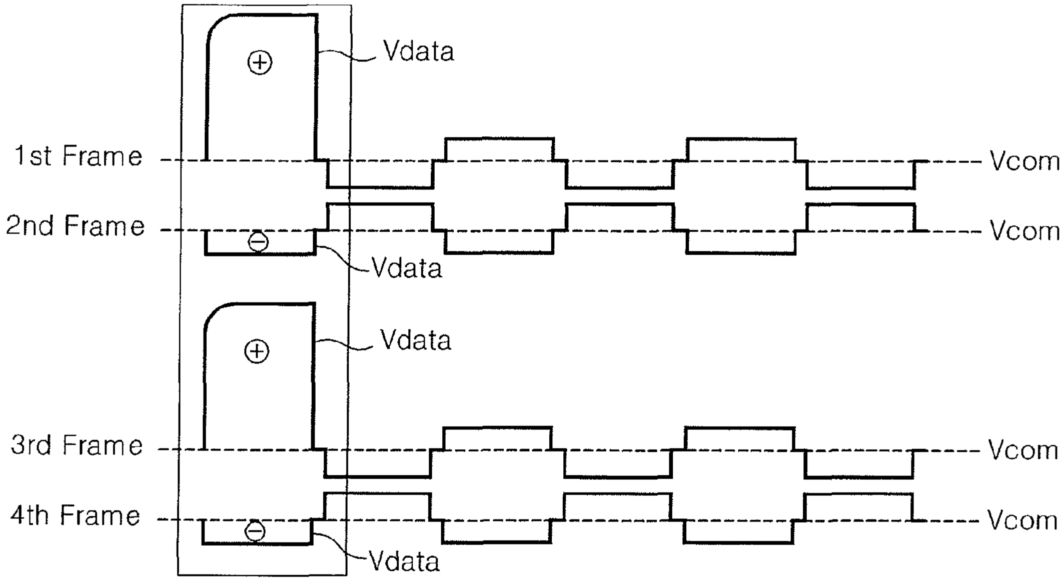
FIG. 2 (Prior Art)
FIG. 2 is a waveform diagram showing an example of data supplied in an interlaced manner.
Figure 3:
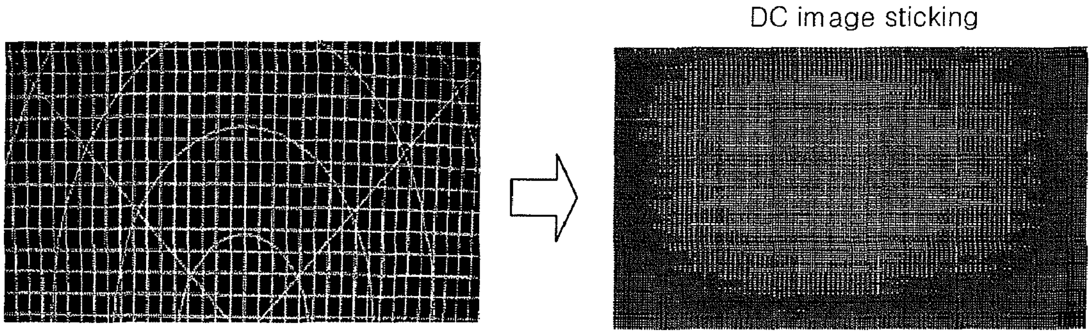
FIG. 3 (Prior Art)
FIG. 3 shows a screen of an experimental result of DC image sticking appearing by interlaced data.
Figure 4:
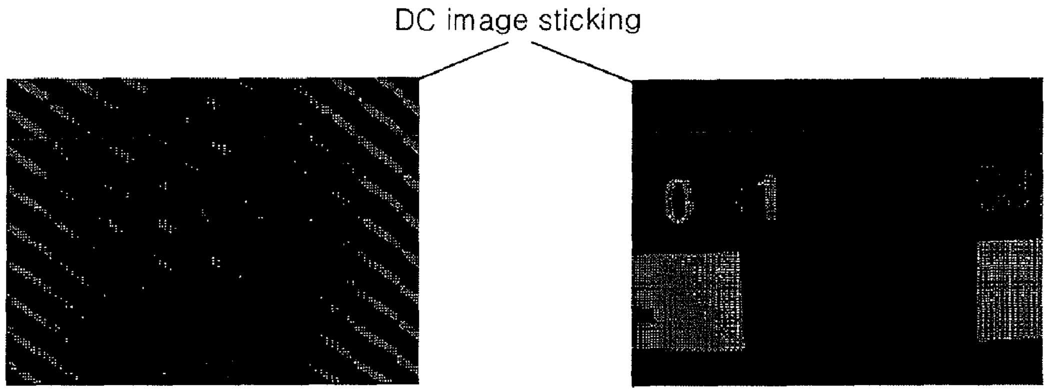
FIG. 4 (Prior Art)
FIG. 4 shows a screen of an experimental result of DC image sticking appearing by scrolling data.
Figure 6:
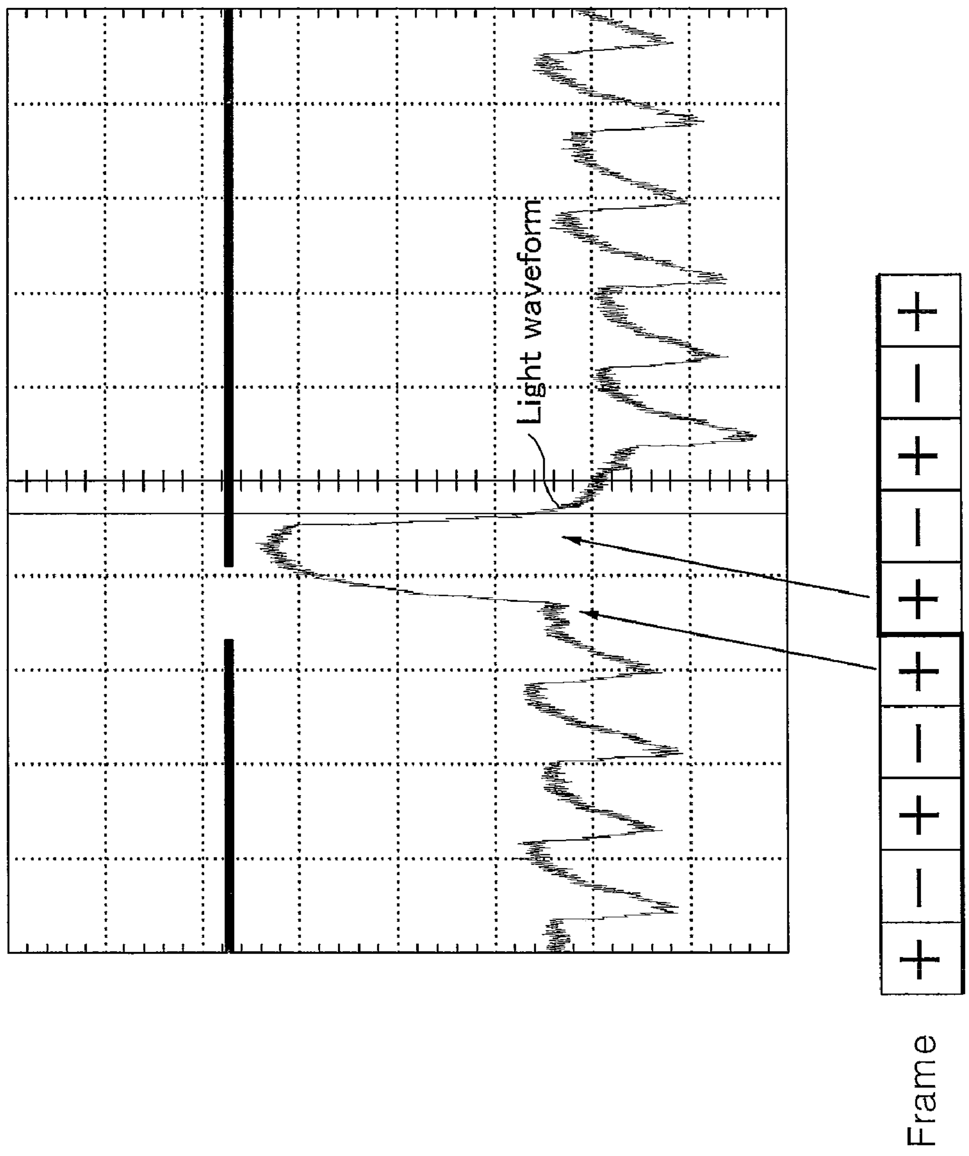
FIG. 6 shows an experimental result of a flicker phenomenon appearing in an Nth frame period.

As can be seen from a light waveform of FIG. 6 which is an output waveform diagram of a photosensor on a liquid crystal display panel, because the liquid crystal cells are repeatedly charged to the data voltage having the same polarity as the data voltage in the previous frame period of the N-th frame period during the N-th frame period, the DC image sticking can be prevented. However, the amount of light may increase by the excessive accumulation of the data voltages charged to the liquid crystal cells during the N-th frame period. An observer may see a flicker phenomenon, in which a luminance increases every N frame periods, by the accumulation of the data voltages with the same polarity. Accordingly, the liquid crystal display and the driving method thereof according to the exemplary embodiment of the invention control a phase of the polarity control signal POL and timely disperse the liquid crystal cells successively charged to the data voltage with the same polarity during two frame periods as shown in FIGS. 8 to 17. In other words, the liquid crystal display and the driving method thereof according to the exemplary embodiment of the invention disperse the liquid crystal cells charged to the data voltage of the same polarity during two frame periods among 2 to 4 frame periods following the N-th frame period using only the polarity control signal POL to prevent the flicker phenomenon in the N-th frame period and the DC drive of the liquid crystal. Hence, the stains can be prevented.

Figure 7:
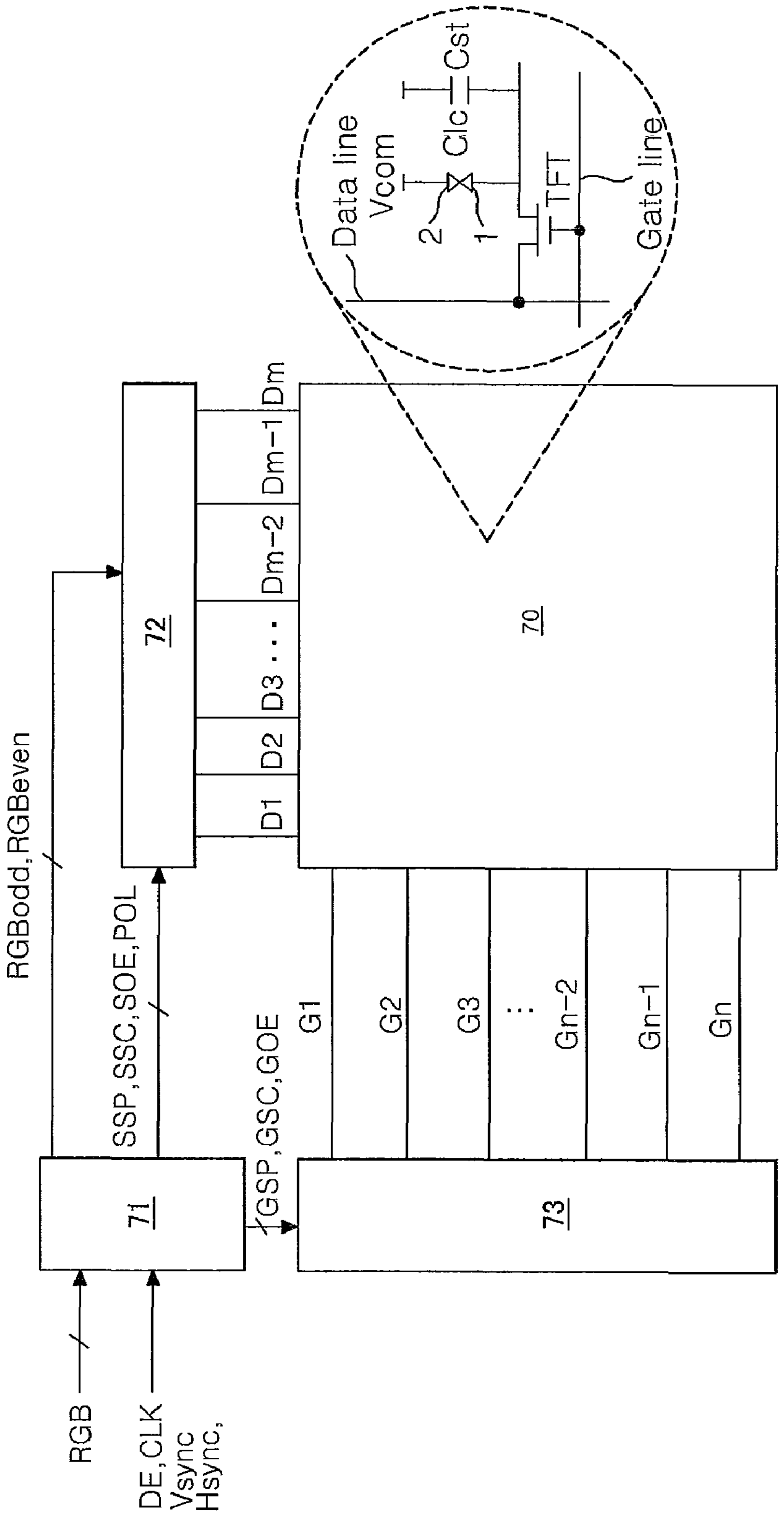
FIG. 7 is a block diagram of the liquid crystal display according to the exemplary embodiment of the invention.

FIG. 7 is a block diagram of the liquid crystal display according to the exemplary embodiment of the invention.

As shown in FIG. 7, the liquid crystal display according to the exemplary embodiment of the invention includes a liquid crystal display panel 70, a timing controller 71, a data drive circuit 72, and a gate drive circuit 73.

The liquid crystal display panel 70 includes an upper glass substrate, a lower glass substrate, and a liquid crystal layer between the upper and lower glass substrates. The lower glass substrate of the liquid crystal display panel 70 includes m data lines D1 to Dm and n gate lines G1 to Gn crossing each other. The liquid crystal display panel 70 includes m×n liquid crystal cells Clc arranged in a matrix array at each crossing of the m data lines D1 to Dm and the n gate lines G1 to Gn. The liquid crystal cells Clc include a first liquid crystal cell group and a second liquid crystal cell group. The lower glass substrate further includes a thin film transistor TFT, a pixel electrode 1 of the liquid crystal cell Clc connected to the thin film transistor TFT, and a storage capacitor Cst, and the like.

The upper glass substrate of the liquid crystal display panel 70 includes a black matrix, a color filter, and a common electrode 2. The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode. Polarizers having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

The timing controller 71 divides digital video data RGB into odd-numbered pixel data RGBodd and even-numbered pixel data RGBeven so as to lower a transmission frequency of the digital video data RGB, and then supplies the data RGBodd and RGBeven to the data drive circuit 72 through 6 data buses. The timing controller 71 receives timing signals, such as vertical and horizontal sync signals Vsync and Hsync, a data enable signal DE, a clock signal CLK, and produces timing control signals for controlling operation timing of the data drive circuit 72 and the gate drive circuit 73. The timing control signals include a gate start pulse GSP, a gate shift clock signal GSC, a gate output enable signal GOE, a source start pulse SSP, a source sampling clock signal SSC, a source output enable signal SOE, and a polarity control signal POL. The gate start pulse GSP indicates a scan start line of a scan operation in 1 vertical period in which one screen is displayed. The gate shift clock signal GSC is a timing control signal that is input to a shift resistor installed in the gate drive circuit 73 to sequentially shift the gate start pulse GSP, and has a pulse width corresponding to a turned-on period of the thin film transistor TFT. The gate output enable signal GOE directs an output of the gate drive circuit 73. The source start pulse SSP indicates a start pixel in 1 horizontal line to which data will be displayed. The source sampling clock signal SSC directs a data latch operation to the data drive circuit 72 based on a rising or falling edge. The source output enable signal SOE directs an output of the data drive circuit 72. The polarity control signal POL indicates a polarity of the data voltage that will be supplied to the liquid crystal cells Clc of the liquid crystal display panel 70. A logic state of the polarity control signal POL is inverted every n horizontal periods (where, n is a positive integer), and a phase of the polarity control signal POL is inverted every one frame period. However, a logic inverting period of the polarity control signal POL during frame periods ranging from the N-th frame period to 2 or more frame periods following the N-th frame period is longer than a logic inverting period of the polarity control signal in the other frame periods.

The data drive circuit 72 latches the digital video data RGBodd and RGBeven under the control of the timing controller 71. Then, the data drive circuit 72 converts the digital video data RGBodd and RGBeven into analog positive and negative gamma compensation voltages to supply the positive and negative gamma compensation voltages to the data lines D1 to Dm. The data drive circuit 72 inverts the polarity of the data voltage in response to the polarity control signal POL. While the data drive circuit 72 outputs the negative polarity data voltage when the polarity control signal POL is in a low logic state, the data drive circuit 72 outputs the positive polarity data voltage when the polarity control signal POL is in a high logic state.

The gate drive circuit 73 includes a shift resistor, a level shifter for shifting an output signal of the shift resistor to a swing width suitable for a TFT drive of the liquid crystal cells Clc, and an output buffer. The gate drive circuit 73 includes a plurality of gate drive integrated circuits (ICs) and sequentially outputs gate pulses (or scan pulses) each having a width of about 1 horizontal period.

Figure 8:
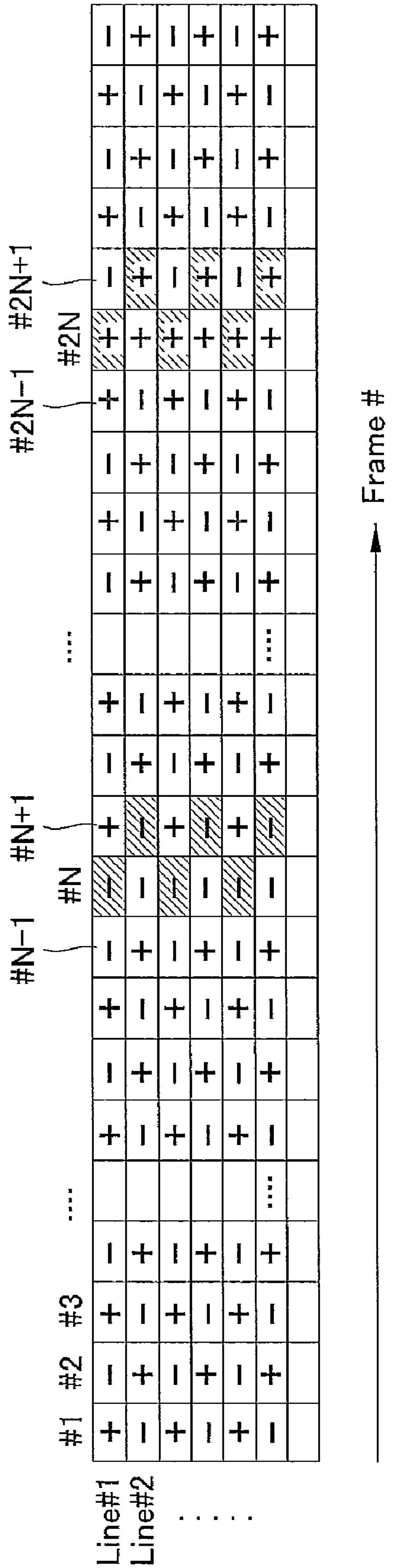
FIG. 8 is a diagram showing a polarity of a data voltage charged to liquid crystal cells in a first implementation of the method for driving the liquid crystal display.
Figure 9:
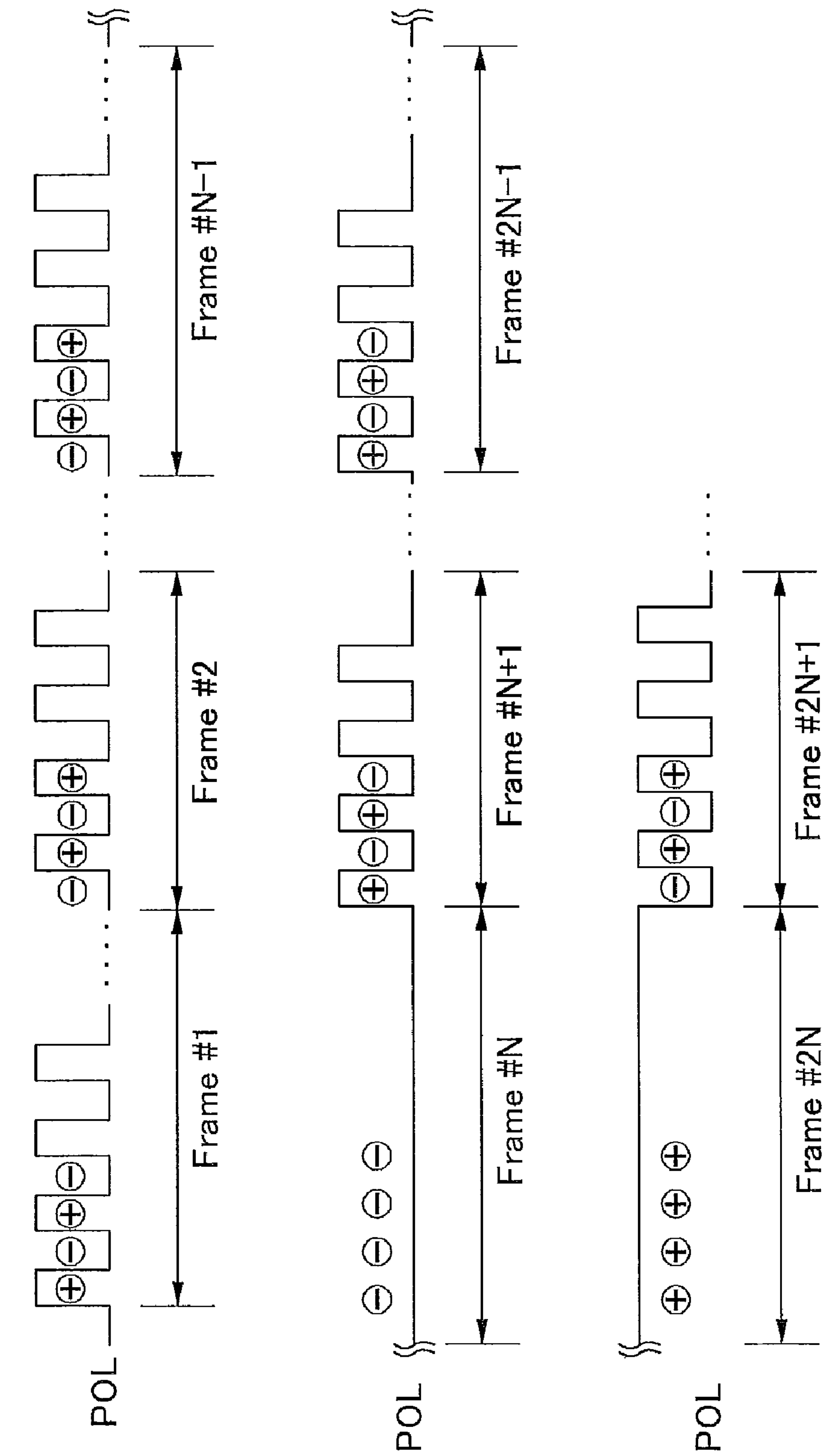
FIG. 9 is a waveform diagram showing a polarity control signal for controlling the polarity of the data voltage of FIG. 8.

FIGS. 8 and 9 are diagrams showing a first implementation of the method for driving the liquid crystal display according to the exemplary embodiment of the invention.

Figure 12:
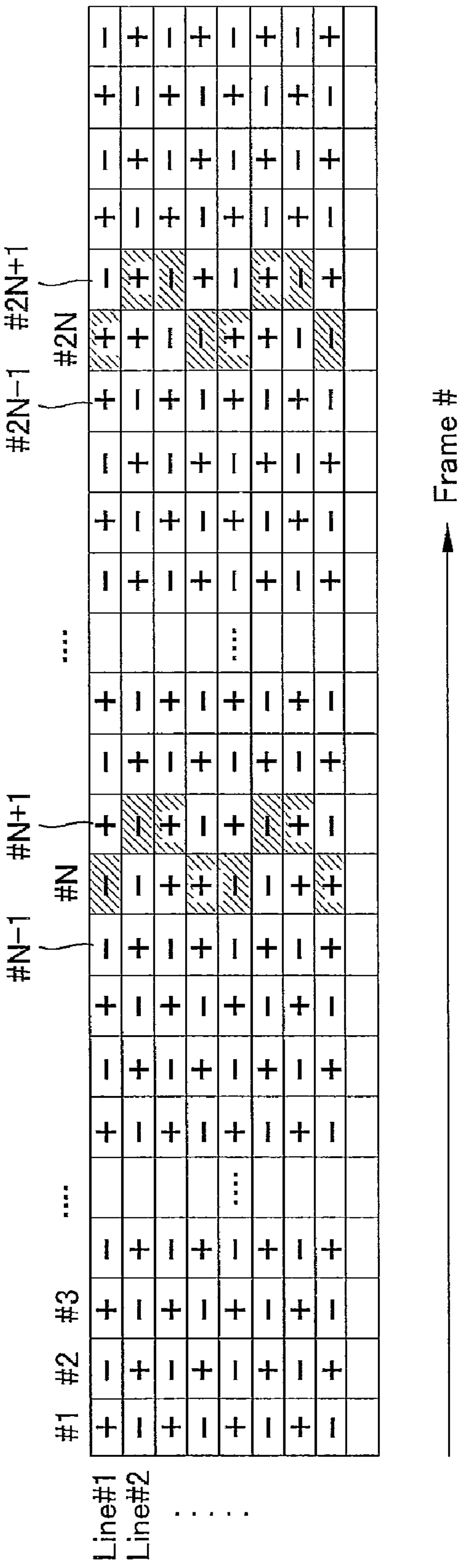
FIG. 12 is a diagram showing a polarity of a data voltage charged to the liquid crystal cells in a third implementation of the method for driving the liquid crystal display.

In FIG. 8, "+" indicates the liquid crystal cells charged to the positive polarity data voltage, and "−" indicates the liquid crystal cells charged to the negative polarity data voltage. As an example of the liquid crystal cells, four liquid crystal cells aligned in a direction of the data line are shown in FIG. 12. A transverse axis indicates a frame period, namely, time, and a longitudinal axis indicates lines, namely, the display surface. The hatched liquid crystal cells are the liquid crystal cells charged to the data voltage with the same polarity during two frame periods every N frame periods.

As shown in FIGS. 8 and 9, the timing controller 71 generates the polarity control signal POL, whose a logic state is inverted every one horizontal period in order of high, low, high, and low logic states, in odd-numbered frame periods of first to (N−1)th frame periods. The timing controller 71 generates the polarity control signal POL, whose a logic state is inverted every one horizontal period in order of low, high, low, and high logic states, in even-numbered frame periods of the first to (N−1)th frame periods. Hence, a phase of the polarity control signal POL can be inverted in each of the first to (N−1)th frame periods. In other words, a polarity of the data voltage charged to all the liquid crystal cells during one frame period of the first to (N−1)th frame periods is different from a polarity of the data voltage charged to all the liquid crystal cells during a next frame period.

The timing controller 71 fixes the polarity control signal POL in a low logic state during an Nth frame period. Accordingly, the liquid crystal cells of odd-numbered lines Line#1, Line#3, Line#5, . . . in the Nth frame period are charged to a negative polarity data voltage equal to the polarity of the data voltage charged to the liquid crystal cells of odd-numbered lines Line#1, Line#3, Line#5, . . . in the (N−1)th frame period.

After the timing controller 71 generates the polarity control signal POL, whose a logic state is inverted every one horizontal period in order of high, low, high, and low logic states, in an (N+1)th frame period, a phase of the polarity control signal POL is inverted in each of the (N+1)th to (2N−1)th frame periods. As a result, the liquid crystal cells of even-numbered lines Line#2, Line#4, Line#6, . . . in the (N+1)th frame period are charged to a negative polarity data voltage equal to the polarity of the data voltage charged to the liquid crystal cells of even-numbered lines Line#2, Line#4, Line#6, . . . in the Nth frame period. Further, a polarity of the data voltage charged to all the liquid crystal cells in a frame period of the (N+2)th to (2N−1)th frame periods is opposite to a polarity of the data voltage charged to all the liquid crystal cells in a next frame period.

The timing controller 71 fixes the polarity control signal POL in a high logic state during a 2Nth frame period. Accordingly, the liquid crystal cells of odd-numbered lines Line#1, Line#3, Line#5, . . . in the 2Nth frame period are charged to a positive polarity data voltage equal to the polarity of the data voltage charged to the liquid crystal cells of odd-numbered lines Line#1, Line#3, Line#5, . . . in the (2N−1)th frame period.

After the timing controller 71 generates the polarity control signal POL, whose a logic state is inverted every one horizontal period in order of low, high, low, and high logic states, in a (2N+1)th frame period, a phase of the polarity control signal POL is inverted in each of the (2N+1)th to (3N−1)th frame periods. As a result, the liquid crystal cells of even-numbered lines Line#2, Line#4, Line#6, . . . in the (2N+1)th frame period are charged to a positive polarity data voltage equal to the polarity of the data voltage charged to the liquid crystal cells of even-numbered lines Line#2, Line#4, Line#6, . . . in the 2Nth frame period. Further, a polarity of the data voltage charged to all the liquid crystal cells in a frame period of the (2N+2)th to (3N−1)th frame periods is opposite to a polarity of the data voltage charged to all the liquid crystal cells in a next frame period.

The liquid crystal display and the method for driving the same according to the first implementation time-divide the liquid crystal cells into the odd-numbered liquid crystal cells and the even-numbered liquid crystal cells during two frame periods, and charge the liquid crystal cells in the Nth frame period to the data voltage whose a polarity is equal to a polarity of the data voltage charged to the liquid crystal cells in a previous frame period of the Nth frame period every N frame periods. Hence, the flicker appearing every N frame periods can be reduced. Further, the liquid crystal display and the method for driving the same according to the first implementation changes a polarity of the data voltage charged to the liquid crystal cells every N frame periods from "++" into "−−" or from "−−" into "++", thereby suppressing the DC drive of the liquid crystal cells. Hence, the stains can be reduced.

Figure 10:
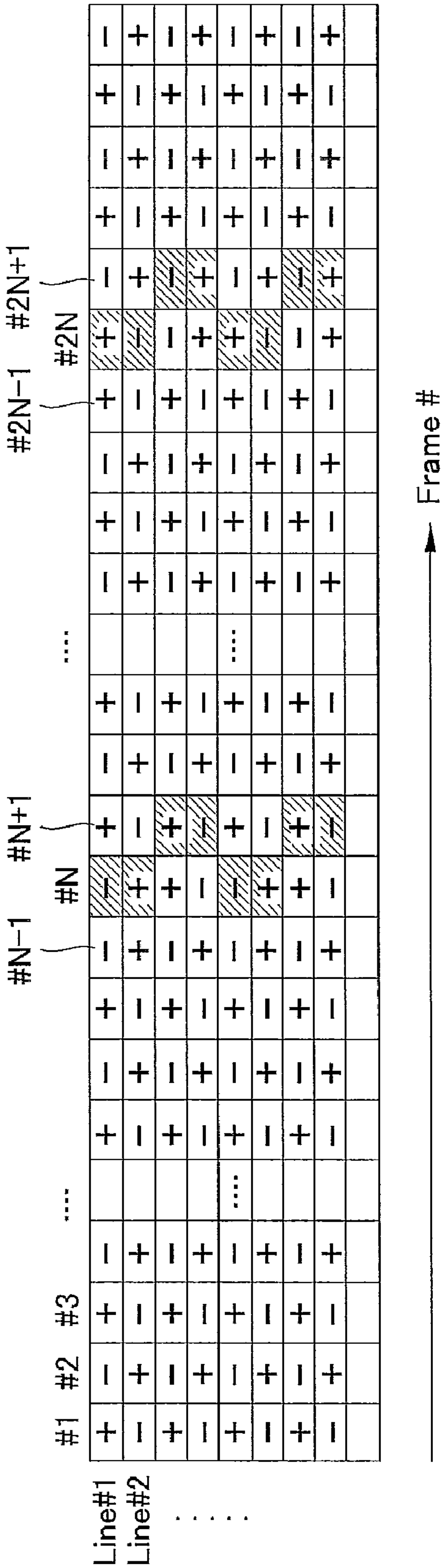
FIG. 10 is a diagram showing a polarity of a data voltage charged to the liquid crystal cells in a second implementation of the method for driving the liquid crystal display.
Figure 11:
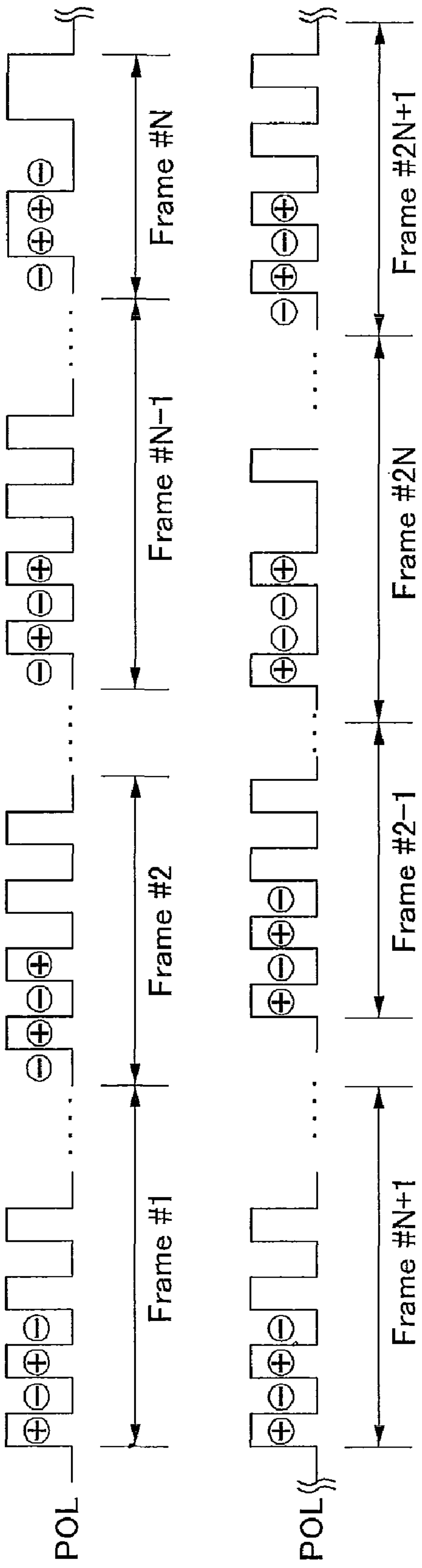
FIG. 11 is a waveform diagram showing a polarity control signal for controlling the polarity of the data voltage of FIG. 10.

FIGS. 10 and 11 are diagrams showing a first implementation of the method for driving the liquid crystal display according to the exemplary embodiment of the invention.

In FIG. 10, "+" indicates the liquid crystal cells charged to the positive polarity data voltage, and "−" indicates the liquid crystal cells charged to the negative polarity data voltage. As an example of the liquid crystal cells, four liquid crystal cells aligned in a direction of the data line are shown in FIG. 12. A transverse axis indicates a frame period, namely, time, and a longitudinal axis indicates lines, namely, the display surface. The hatched liquid crystal cells are the liquid crystal cells charged to the data voltage with the same polarity during two frame periods every N frame periods.

As shown in FIGS. 10 and 11, the timing controller 71 generates the polarity control signal POL, whose a logic state is inverted every one horizontal period in order of high, low, high, and low logic states, in odd-numbered frame periods of first to (N−1)th frame periods. The timing controller 71 generates the polarity control signal POL, whose a logic state is inverted every one horizontal period in order of low, high, low, and high logic states, in even-numbered frame periods of the first to (N−1)th frame periods Hence, a phase of the polarity control signal POL can be inverted in each of the first to (N−1)th frame periods. In other words, a polarity of the data voltage charged to all the liquid crystal cells during one frame period of the first to (N−1)th frame periods is different from a polarity of the data voltage charged to all the liquid crystal cells during a next frame period.

The timing controller 71 allows the polarity control signal POL to sequentially go through low, high, high, and low logic states in an Nth frame period. In other words, after initial 1 horizontal period elapses, the logic state of the polarity control signal POL is inverted, and then the logic state of the polarity control signal POL is inverted every 2 horizontal periods. Accordingly, the liquid crystal cells of (4k+1)th lines Line#1, Line#5, . . . in the Nth frame period are charged to a negative polarity data voltage equal to the polarity of the data voltage charged to the liquid crystal cells of (4k+1)th lines Line#1, Line#5, . . . in the (N−1)th frame period, where k is an integer equal to or larger than 0. Further, the liquid crystal cells of (4k+2)th lines Line#2, Line#6, . . . in the Nth frame period are charged to a positive polarity data voltage equal to the polarity of the data voltage charged to the liquid crystal cells of (4k+2)th lines Line#2, Line#6, . . . in the (N−1)th frame period.

After the timing controller 71 generates the polarity control signal POL, whose a logic state is inverted every one horizontal period in order of high, low, high, and low logic states, in an (N+1)th frame period, a phase of the polarity control signal POL is inverted in each of the (N+1)th to (2N−1)th frame periods. As a result, the liquid crystal cells of (4k+3)th lines Line#3, Line#7, . . . in the (N+1)th frame period are charged to a positive polarity data voltage equal to the polarity of the data voltage charged to the liquid crystal cells of (4k+3)th lines Line#3, Line#7, . . . in the Nth frame period. The liquid crystal cells of (4k+4)th lines Line#4, Line#8, . . . in the (N+1)th frame period are charged to a negative polarity data voltage equal to the polarity of the data voltage charged to the liquid crystal cells of (4k+4)th lines Line#4, Line#8, . . . in the Nth frame period. Further, a polarity of the data voltage charged to all the liquid crystal cells during one frame period of the (N+2)th to (2N−1)th frame periods is different from a polarity of the data voltage charged to all the liquid crystal cells during a next frame period.

The timing controller 71 generates the polarity control signal POL, whose a phase is opposite to a phase of the polarity control signal POL in the Nth frame period, in a 2Nth frame period. A logic state of the polarity control signal POL is inverted in order of high, low, low, and high logic states in the 2Nth frame period. In other words, after initial 1 horizontal period elapses, the logic state of the polarity control signal POL is inverted, and then the logic state of the polarity control signal POL is inverted every 2 horizontal periods. Accordingly, the liquid crystal cells of (4k+1)th lines Line#1, Line#5, . . . in the 2Nth frame period are charged to a positive polarity data voltage equal to the polarity of the data voltage charged to the liquid crystal cells of (4k+1)th lines Line#1, Line#5, . . . in the (2N−1)th frame period. Further, the liquid crystal cells of (4k+2)th lines Line#2, Line#6, . . . in the 2Nth frame period are charged to a negative data voltage equal to the polarity of the data voltage charged to the liquid crystal cells of (4k+2)th lines Line#2, Line#6, . . . in the (2N−1)th frame period.

After the timing controller 71 generates the polarity control signal POL, whose a logic state is inverted every one horizontal period in order of low, high, low, and high logic states, in a (2N+1)th frame period, a phase of the polarity control signal POL is inverted in each of the (2N+1)th to (3N−1)th frame periods. As a result, the liquid crystal cells of (4k+3)th lines Line#3, Line#7, . . . in the (2N+1)th frame period are charged to a negative polarity data voltage equal to the polarity of the data voltage charged to the liquid crystal cells of (4k+3)th lines Line#3, Line#7, . . . in the 2Nth frame period. The liquid crystal cells of (4k+4)th lines Line#4, Line#8, . . . in the (2N+1)th frame period are charged to a positive polarity data voltage equal to the polarity of the data voltage charged to the liquid crystal cells of (4k+4)th lines Line#4, Line#8, . . . in the 2Nth frame period. Further, a polarity of the data voltage charged to all the liquid crystal cells during one frame period of the (2N+2)th to (3N−1)th frame periods is different from a polarity of the data voltage charged to all the liquid crystal cells during a next frame period.

The liquid crystal display and the method for driving the same according to the second implementation time-divide the liquid crystal cells into the liquid crystal cells of the (4k+1)th lines and the (4k+2)th lines and the liquid crystal cells of the (4k+3)th lines and the (4k+4)th lines during two frame periods, and charge the liquid crystal cells in the Nth frame period to the data voltage whose a polarity is equal to a polarity of the data voltage charged to the liquid crystal cells in a previous frame period of the Nth frame period every N frame periods. Hence, the flicker appearing every N frame periods can be reduced. Further, the liquid crystal display and the method for driving the same according to the second implementation changes a polarity of the data voltage charged to the liquid crystal cells every N frame periods from "++" into "−−" or from "−−" into "++", thereby suppressing the DC drive of the liquid crystal cells. Hence, the stains can be reduced.

Figure 13:
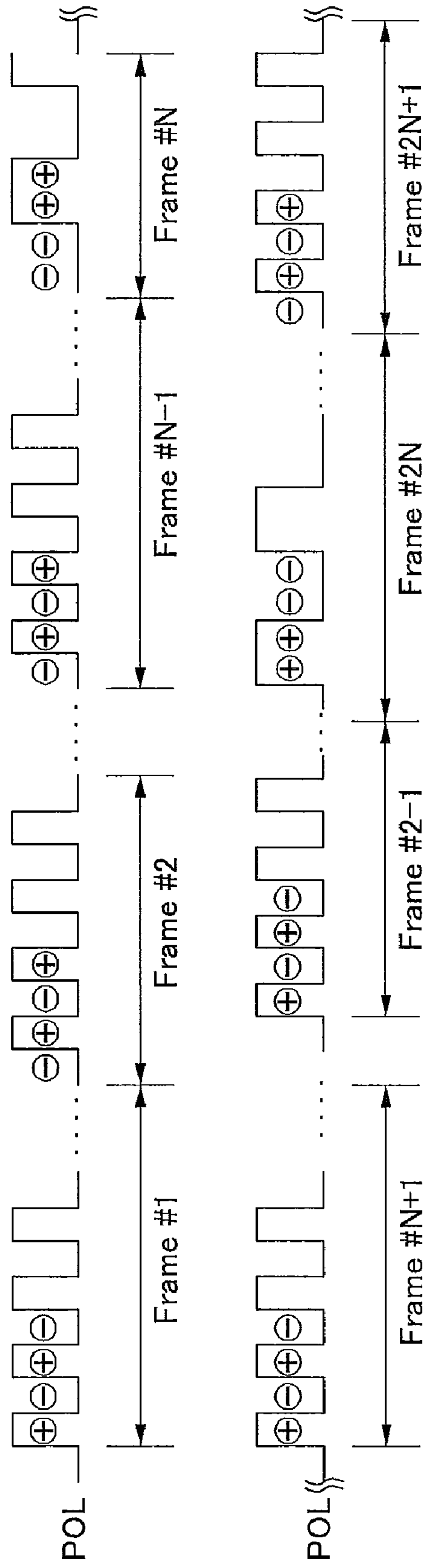
FIG. 13 is a waveform diagram showing a polarity control signal for controlling the polarity of the data voltage of FIG. 12.

FIGS. 12 and 13 are diagrams showing a third implementation of the method for driving the liquid crystal display according to the exemplary embodiment of the invention.

In FIG. 12, "+" indicates the liquid crystal cells charged to the positive polarity data voltage, and "−" indicates the liquid crystal cells charged to the negative polarity data voltage. As an example of the liquid crystal cells, four liquid crystal cells aligned in a direction of the data line are shown in FIG. 12. A transverse axis indicates a frame period, namely, time, and a longitudinal axis indicates lines, namely, the display surface. The hatched liquid crystal cells are the liquid crystal cells charged to the data voltage with the same polarity during two frame periods every N frame periods.

As shown in FIGS. 12 and 13, the timing controller 71 generates the polarity control signal POL, whose a logic state is inverted every one horizontal period in order of high, low, high, and low logic states, in odd-numbered frame periods of first to (N−1)th frame periods. The timing controller 71 generates the polarity control signal POL, whose a logic state is inverted every one horizontal period in order of low, high, low, and high logic states, in even-numbered frame periods of the first to (N−1)th frame periods. Hence, a phase of the polarity control signal POL can be inverted in each of the first to (N−1)th frame periods. In other words, a polarity of the data voltage charged to all the liquid crystal cells during one frame period of the first to (N−1)th frame periods is different from a polarity of the data voltage charged to all the liquid crystal cells during a next frame period.

The timing controller 71 allows the polarity control signal POL to sequentially go through low, low, high, and high logic states in an Nth frame period. The logic state of the polarity control signal POL is inverted every 2 horizontal periods. Accordingly, the liquid crystal cells of (4k+1)th lines Line#1, Line#5, . . . in the Nth frame period are charged to a negative polarity data voltage equal to the polarity of the data voltage charged to the liquid crystal cells of (4k+1)th lines Line#1, Line#5, . . . in the (N−1)th frame period. Further, the liquid crystal cells of (4k+4)th lines Line#4, Line#8, . . . in the Nth frame period are charged to a positive polarity data voltage equal to the polarity of the data voltage charged to the liquid crystal cells of (4k+4)th lines Line#4, Line#8, . . . in the (N−1)th frame period.

After the timing controller 71 generates the polarity control signal POL, whose a logic state is inverted every one horizontal period in order of high, low, high, and low logic states, in an (N+1)th frame period, a phase of the polarity control signal POL is inverted in each of the (N+1)th to (2N−1)th frame periods. As a result, the liquid crystal cells of (4k+2)th lines Line#2, Line#6, . . . in the (N+1)th frame period are charged to a negative polarity data voltage equal to the polarity of the data voltage charged to the liquid crystal cells of (4k+2)th lines Line#2, Line#6, . . . in the Nth frame period. The liquid crystal cells of (4k+3)th lines Line#3, Line#7, . . . in the (N+1)th frame period are charged to a positive polarity data voltage equal to the polarity of the data voltage charged to the liquid crystal cells of (4k+3)th lines Line#3, Line#7, . . . in the Nth frame period. Further, a polarity of the data voltage charged to all the liquid crystal cells during one frame period of the (N+2)th to (2N−1)th frame periods is different from a polarity of the data voltage charged to all the liquid crystal cells during a next frame period.

The timing controller 71 generates the polarity control signal POL, whose a phase is opposite to a phase of the polarity control signal POL in the Nth frame period, in a 2Nth frame period. A logic state of the polarity control signal POL is inverted in order of high, high, low, and low logic states in the 2Nth frame period, and the logic state of the polarity control signal POL is inverted every 2 horizontal periods. Accordingly, the liquid crystal cells of (4k+1)th lines Line#1, Line#5, . . . in the 2Nth frame period are charged to a positive polarity data voltage equal to the polarity of the data voltage charged to the liquid crystal cells of (4k+1)th lines Line#1, Line#5, . . . in the (2N−1)th frame period. Further, the liquid crystal cells of (4k+4)th lines Line#4, Line#8, . . . in the 2Nth frame period are charged to a negative data voltage equal to the polarity of the data voltage charged to the liquid crystal cells of (4k+4)th lines Line#4, Line#8, . . . in the (2N−1)th frame period.

After the timing controller 71 generates the polarity control signal POL, whose a logic state is inverted every one horizontal period in order of low, high, low, and high logic states, in a (2N+1)th frame period, a phase of the polarity control signal POL is inverted in each of the (2N+1)th to (3N−1)th frame periods. As a result, the liquid crystal cells of (4k+2)th lines Line#2, Line#6, . . . in the (2N+1)th frame period are charged to a positive polarity data voltage equal to the polarity of the data voltage charged to the liquid crystal cells of (4k+2)th lines Line#2, Line#6, . . . in the 2Nth frame period. The liquid crystal cells of (4k+3)th lines Line#3, Line#7, . . . in the (2N+1)th frame period are charged to a negative polarity data voltage equal to the polarity of the data voltage charged to the liquid crystal cells of (4k+3)th lines Line#3, Line#7, . . . in the 2Nth frame period. Further, a polarity of the data voltage charged to all the liquid crystal cells during one frame period of the (2N+2)th to (3N−1)th frame periods is different from a polarity of the data voltage charged to all the liquid crystal cells during a next frame period.

The liquid crystal display and the method for driving the same according to the third implementation time-divide the liquid crystal cells into the liquid crystal cells of the (4k+1)th lines and the (4k+4)th lines and the liquid crystal cells of the (4k+2)th lines and the (4k+3)th lines during two frame periods, and charge the liquid crystal cells in the Nth frame period to the data voltage whose a polarity is equal to a polarity of the data voltage charged to the liquid crystal cells in a previous frame period of the Nth frame period every N frame periods. Hence, the flicker appearing every N frame periods can be reduced. Further, the liquid crystal display and the method for driving the same according to the third implementation changes a polarity of the data voltage charged to the liquid crystal cells every N frame periods from "++", into "−−" or from "−−" into "++", thereby suppressing the DC drive of the liquid crystal cells. Hence, the stains can be reduced.

Figure 14:
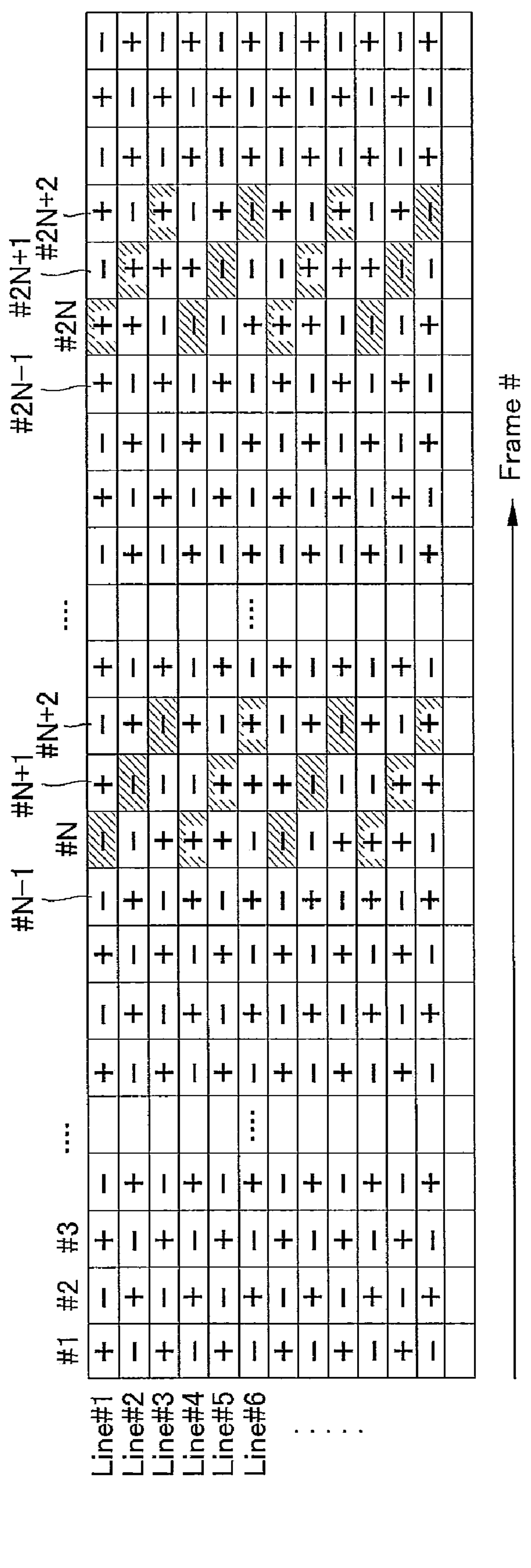
FIG. 14 is a diagram showing a polarity of a data voltage charged to the liquid crystal cells in a fourth implementation of the method for driving the liquid crystal display.
Figure 15:
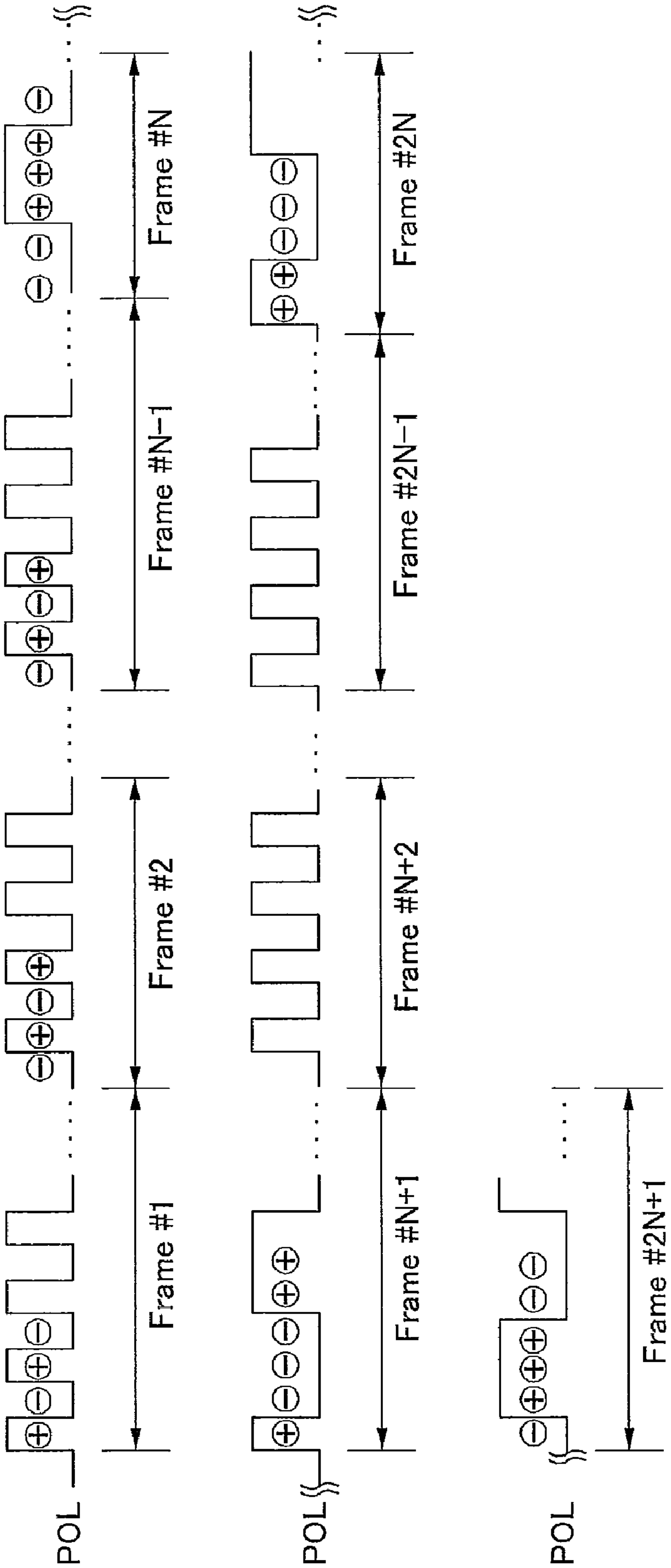
FIG. 15 is a waveform diagram showing a polarity control signal for controlling the polarity of the data voltage of FIG. 14.

FIGS. 14 and 15 are diagrams showing a fourth implementation of the method for driving the liquid crystal display according to the exemplary embodiment of the invention.

In FIG. 14, "+" indicates the liquid crystal cells charged to the positive polarity data voltage, and "−" indicates the liquid crystal cells charged to the negative polarity data voltage. As an example of the liquid crystal cells, four liquid crystal cells aligned in a direction of the data line are shown in FIG. 12. A transverse axis indicates a frame period, namely, time, and a longitudinal axis indicates lines, namely, the display surface. The hatched liquid crystal cells are the liquid crystal cells charged to the data voltage with the same polarity during two frame periods every N frame periods.

As shown in FIGS. 14 and 15, the timing controller 71 generates the polarity control signal POL, whose a logic state is inverted every one horizontal period in order of high, low, high, and low logic states, in odd-numbered frame periods of first to (N−1)th frame periods. The timing controller 71 generates the polarity control signal POL, whose a logic state is inverted every one horizontal period in order of low, high, low, and high logic states, in even-numbered frame periods of the first to (N−1)th frame periods. Hence, a phase of the polarity control signal POL can be inverted in each of the first to (N−1)th frame periods. In other words, a polarity of the data voltage charged to all the liquid crystal cells during one frame period of the first to (N−1)th frame periods is different from a polarity of the data voltage charged to all the liquid crystal cells during a next frame period.

The timing controller 71 allows the polarity control signal POL to sequentially go through low, low, high, high, high and low logic states in an Nth frame period. In other words, after initial 2 horizontal periods elapse, the logic state of the polarity control signal POL is inverted, and then the logic state of the polarity control signal POL is inverted every 3 horizontal periods. Accordingly, the liquid crystal cells of (6k+1)th lines Line#1, Line#7, . . . in the Nth frame period are charged to a negative polarity data voltage equal to the polarity of the data voltage charged to the liquid crystal cells of (6k+1)th lines Line#1, Line#7, . . . in the (N−1)th frame period. Further, the liquid crystal cells of (6k+4)th lines Line#4, Line#10, . . . in the Nth frame period are charged to a positive polarity data voltage equal to the polarity of the data voltage charged to the liquid crystal cells of (6k+4)th lines Line#4, Line#10, . . . in the (N−1)th frame period.

The timing controller 71 generates the polarity control signal POL, whose a logic state is inverted in order of high, low, low, low, high, and high logic states during 6 horizontal periods, in an (N+1)th frame period. In other words, after initial 1 horizontal period elapses, the logic state of the polarity control signal POL is inverted, and then the logic state of the polarity control signal POL is inverted every 3 horizontal periods. Accordingly, the liquid crystal cells of (6k+2)th lines Line#2, Line#8, . . . in the (N+1)th frame period are charged to a negative polarity data voltage equal to the polarity of the data voltage charged to the liquid crystal cells of (6k+2)th lines Line#2, Line#8, . . . in the Nth frame period. Further, the liquid crystal cells of (6k+5)th lines Line#5, Line#11, . . . in the (N+1)th frame period are charged to a positive polarity data voltage equal to the polarity of the data voltage charged to the liquid crystal cells of (6k+5)th lines Line#5, Line#1, . . . in the Nth frame period.

After the timing controller 71 generates the polarity control signal POL, whose a logic state is inverted every one horizontal period in order of low, high, low, and high logic states, in an (N+2)th frame period, a phase of the polarity control signal POL is inverted in each of the (N+2)th to (2N−1)th frame periods. As a result, the liquid crystal cells of (6k+3)th lines Line#3, Line#9, . . . in the (N+2)th frame period are charged to a negative polarity data voltage equal to the polarity of the data voltage charged to the liquid crystal cells of (6k+3)th lines Line#3, Line#9, . . . in the (N+1)th frame period. The liquid crystal cells of (6k+6)th lines Line#6, Line#12, . . . in the (N+2)th frame period are charged to a positive polarity data voltage equal to the polarity of the data voltage charged to the liquid crystal cells of (6k+6)th lines Line#6, Line#12, . . . in the (N+1)th frame period. Further, a polarity of the data voltage charged to all the liquid crystal cells during one frame period of the (N+3)th to (2N−1)th frame periods is different from a polarity of the data voltage charged to all the liquid crystal cells during a next frame period.

The timing controller 71 generates the polarity control signal POL, whose a phase is inverse to a phase of the polarity control signal POL in the Nth frame period, in a 2Nth frame period. The polarity control signal POL sequentially goes through high, high, low, low, low, and high logic states during 6 horizontal periods in the 2Nth frame period. After initial 2 horizontal periods elapse, the logic state of the polarity control signal POL is inverted, and then the logic state of the polarity control signal POL is inverted every 3 horizontal periods. Accordingly, the liquid crystal cells of (6k+1)th lines Line#1, Line#7, . . . in the 2Nth frame period are charged to a positive polarity data voltage equal to the polarity of the data voltage charged to the liquid crystal cells of (6k+1)th lines Line#1, Line#7, . . . in the (2N−1)th frame period. Further, the liquid crystal cells of (6k+4)th lines Line#4, Line#10, . . . in the 2Nth frame period are charged to a negative data voltage equal to the polarity of the data voltage charged to the liquid crystal cells of (6k+4)th lines Line#4, Line#10, . . . in the (2N−1)th frame period.

The timing controller 71 generates the polarity control signal POL, whose a phase is inverse to a phase of the polarity control signal POL in the (N+1)th frame period, in a (2N+1)th frame period. In other words, after initial 1 horizontal period elapses, the logic state of the polarity control signal POL is inverted, and then the logic state of the polarity control signal POL is inverted every 3 horizontal periods. Accordingly, the liquid crystal cells of (6k+2)th lines Line#2, Line#8, . . . in the (2N+1)th frame period are charged to a positive polarity data voltage equal to the polarity of the data voltage charged to the liquid crystal cells of (6k+2)th lines Line#2, Line#8, . . . in the 2Nth frame period. Further, the liquid crystal cells of (6k+5) th lines Line#5, Line#11, . . . in the (2N+1)th frame period are charged to a negative polarity data voltage equal to the polarity of the data voltage charged to the liquid crystal cells of (6k+5)th lines Line#5, Line#11, . . . in the 2Nth frame period.

After the timing controller 71 generates the polarity control signal POL, whose a logic state is inverted every one horizontal period in order of high, low, high, and low logic states, in a (2N+2)th frame period, a phase of the polarity control signal POL is inverted in each of the (2N+2)th to (3N−1)th frame periods. As a result, the liquid crystal cells of (6k+3)th lines Line#3, Line#9, . . . in the (2N+2)th frame period are charged to a positive polarity data voltage equal to the polarity of the data voltage charged to the liquid crystal cells of (6k+3)th lines Line#3, Line#9, . . . in the (2N+1)th frame period. The liquid crystal cells of (6k+6)th lines Line#6, Line#12, . . . in the (2N+2)th frame period are charged to a negative polarity data voltage equal to the polarity of the data voltage charged to the liquid crystal cells of (6k+6)th lines Line#6, Line#12, . . . in the (2N+1)th frame period. Further, a polarity of the data voltage charged to all the liquid crystal cells during one frame period of the (2N+3)th to (3N−1)th frame periods is different from a polarity of the data voltage charged to all the liquid crystal cells during a next frame period.

The liquid crystal display and the method for driving the same according to the fourth implementation time-divide the liquid crystal cells into the liquid crystal cells of the (6k+1)th lines and the (6k+4)th lines, the liquid crystal cells of the (6k+2)th lines and the (6k+5)th lines, and the liquid crystal cells of the (6k+3)th lines and the (6k+6)th lines, and charge the liquid crystal cells to the data voltage with the same polarity during the two neighboring frame periods throughout three frame periods every N frame periods. Hence, the flicker appearing every N frame periods can be reduced. Further, the liquid crystal display and the method for driving the same according to the fourth implementation changes a polarity of the data voltage charged to the liquid crystal cells every N frame periods from "++" into "−−" or from "−−" into "++", thereby suppressing the DC drive of the liquid crystal cells. Hence, the stains can be reduced.

Figure 16:
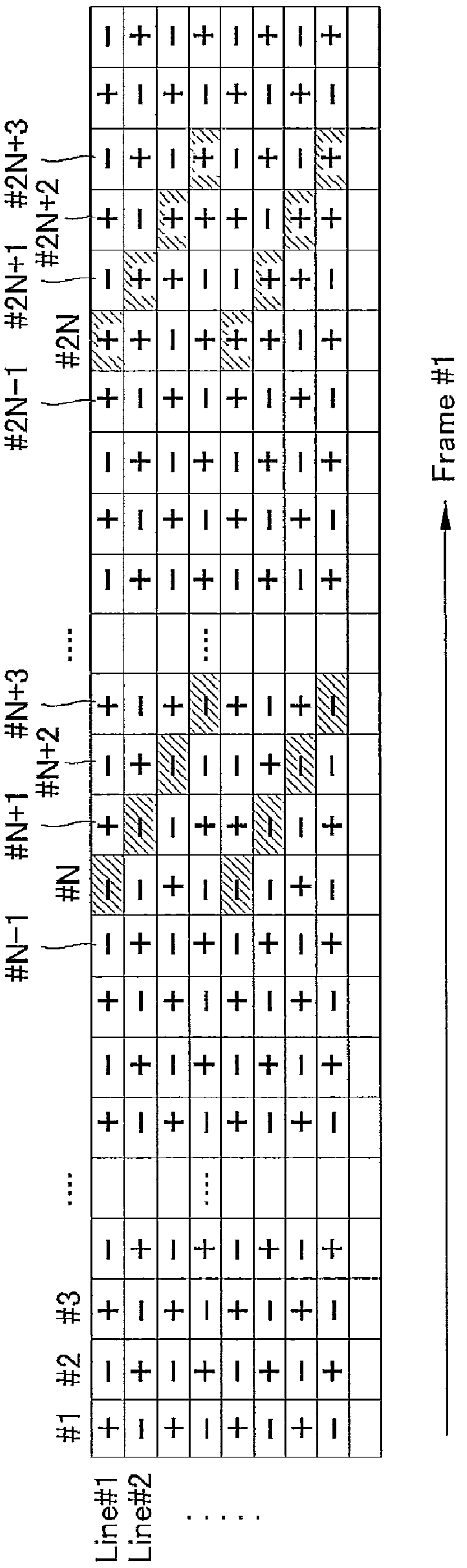
FIG. 16 is a diagram showing a polarity of a data voltage charged to the liquid crystal cells in a fifth implementation of the method for driving the liquid crystal display.
Figure 17:
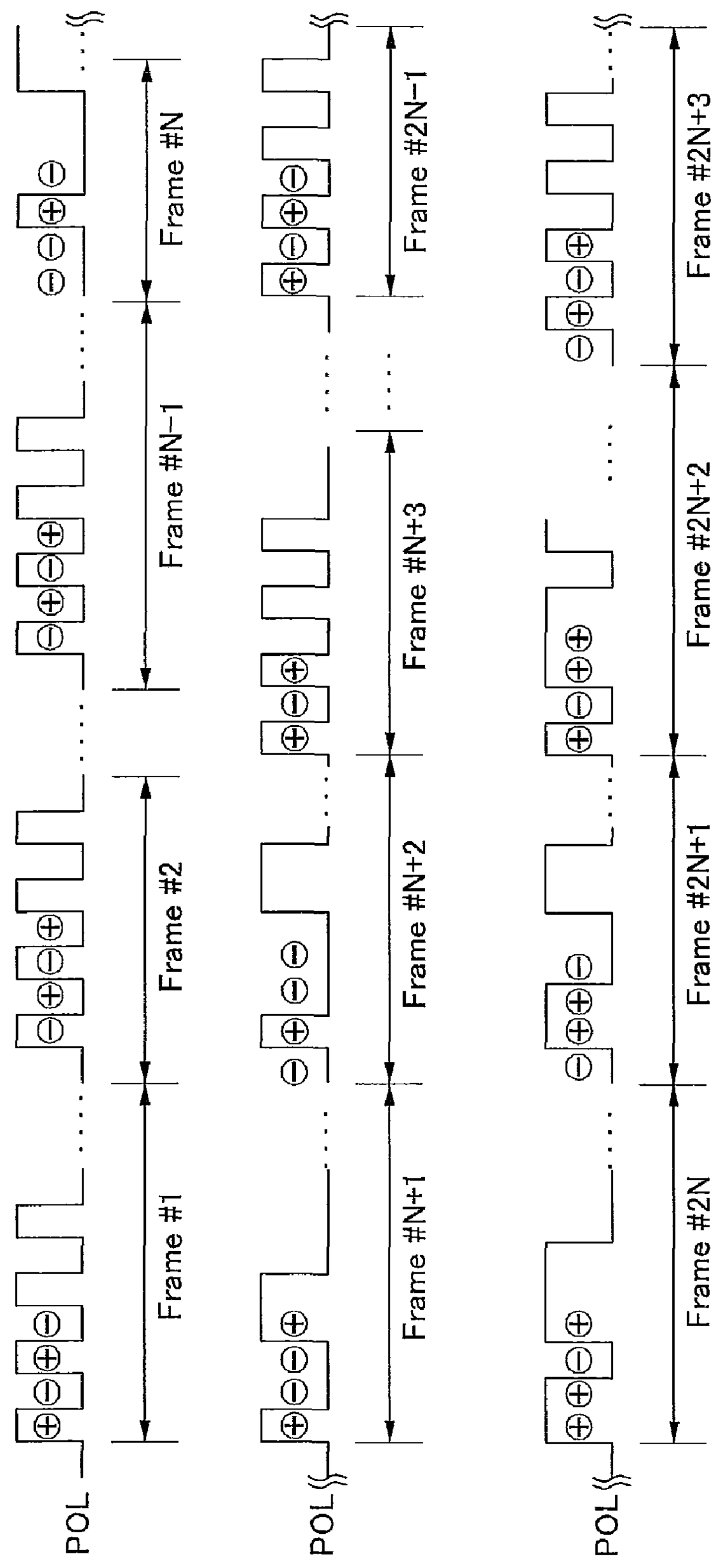
FIG. 17 is a waveform diagram showing a polarity control signal for controlling the polarity of the data voltage of FIG. 16.

FIGS. 16 and 17 are diagrams showing a fifth implementation of the method for driving the liquid crystal display according to the exemplary embodiment of the invention.

In FIG. 16, "+" indicates the liquid crystal cells charged to the positive polarity data voltage, and "−" indicates the liquid crystal cells charged to the negative polarity data voltage. As an example of the liquid crystal cells, four liquid crystal cells aligned in a direction of the data line are shown in FIG. 12. A transverse axis indicates a frame period, namely, time, and a longitudinal axis indicates lines, namely, the display surface. The hatched liquid crystal cells are the liquid crystal cells charged to the data voltage with the same polarity during two frame periods every N frame periods.

As shown in FIGS. 16 and 17, the timing controller 71 generates the polarity control signal POL, whose a logic state is inverted every one horizontal period in order of high, low, high, and low logic states, in odd-numbered frame periods of first to (N−1)th frame periods. The timing controller 71 generates the polarity control signal POL, whose a logic state is inverted every one horizontal period in order of low, high, low, and high logic states, in even-numbered frame periods of the first to (N−1)th frame periods. Hence, a phase of the polarity control signal POL can be inverted in each of the first to (N−1)th frame periods. In other words, a polarity of the data voltage charged to all the liquid crystal cells during one frame period of the first to (N−1)th frame periods is different from a polarity of the data voltage charged to all the liquid crystal cells during a next frame period.

The timing controller 71 allows the polarity control signal POL to sequentially go through low, low, high, and low logic states during 4 horizontal periods in an Nth frame period. After initial 2 horizontal periods elapse, the polarity control signal POL changes from the low logic state to the high logic state. Then, after 1 horizontal period elapses, the polarity control signal POL changes from the high logic state to the low logic state. Then, the polarity control signal POL is in the low logic state during 3 horizontal periods. Accordingly, the liquid crystal cells of (4k+1)th lines Line#1, Line#5, . . . in the Nth frame period are charged to a negative polarity data voltage equal to the polarity of the data voltage charged to the liquid crystal cells of (4k+1)th lines Line#1, Line#5, . . . in the (N−1)th frame period.

The timing controller 71 generates the polarity control signal POL, whose a logic state is inverted every one horizontal period in order of high, low, low, and high logic states during 4 horizontal periods, in an (N+1)th frame period. After initial 1 horizontal period elapses, the polarity control signal POL changes from the high logic state to the low logic state. Then, after 2 horizontal periods elapse, the polarity control signal POL changes from the low logic state to the high logic state. Then, the polarity control signal POL is in the high logic state during 2 horizontal periods. Accordingly, the liquid crystal cells of (4k+2)th lines Line#2, Line#6, . . . in the (N+1)th frame period are charged to a negative polarity data voltage equal to the polarity of the data voltage charged to the liquid crystal cells of (4k+2)th lines Line#2, Line#6, . . . in the Nth frame period.

The timing controller 71 generates the polarity control signal POL, whose a logic state is inverted every one horizontal period in order of low, high, low, and low logic states during 4 horizontal periods, in an (N+2)th frame period. After initial 1 horizontal period elapses, the polarity control signal POL changes from the low logic state to the high logic state. Then, after 1 horizontal period elapses, the polarity control signal POL changes from the high logic state to the low logic state. Then, the polarity control signal POL is in the low logic state during 3 horizontal periods. Accordingly, the liquid crystal cells of (4k+3)th lines Line#3, Line#7, . . . in the (N+2)th frame period are charged to a negative polarity data voltage equal to the polarity of the data voltage charged to the liquid crystal cells of (4k+3)th lines Line#3, Line#7, . . . in the (N+1)th frame period.

After the timing controller 71 generates the polarity control signal POL, whose a logic state is inverted every one horizontal period in order of high, low, high, and low logic states, in an (N+3)th frame period, a phase of the polarity control signal POL is inverted in each of (N+3)th to (2N−1)th frame periods. As a result, the liquid crystal cells of (4k+4)th lines Line#4, Line#8, . . . in the (N+3)th frame period are charged to a negative polarity data voltage equal to the polarity of the data voltage charged to the liquid crystal cells of (4k+4)th lines Line#4, Line#8, . . . in the (N+2)th frame period. Further, a polarity of the data voltage charged to all the liquid crystal cells during one frame period of the (N+4)th to (2N−1)th frame periods is different from a polarity of the data voltage charged to all the liquid crystal cells during a next frame period.

The timing controller 71 generates the polarity control signal POL, whose a phase is inverse to a phase of the polarity control signal POL in the Nth frame period, in a 2Nth frame period. The polarity control signal POL sequentially goes through high, high, low, and high logic states during 4 horizontal periods in the 2Nth frame period. Accordingly, the liquid crystal cells of (4k+1)th lines Line#1, Line#5, . . . in the 2Nth frame period are charged to a positive polarity data voltage equal to the polarity of the data voltage charged to the liquid crystal cells of (4k+1)th lines Line#1, Line#5, . . . in the (2N−1)th frame period.

The timing controller 71 generates the polarity control signal POL, whose a phase is inverse to a phase of the polarity control signal POL in the (N+1)th frame period, in a (2N+1)th frame period. The polarity control signal POL sequentially goes through low, high, high, and low logic states during 4 horizontal periods in the (2N+1)th frame period. Accordingly, the liquid crystal cells of (4k+2)th lines Line#2, Line#6, . . . in the (2N+1)th frame period are charged to a positive polarity data voltage equal to the polarity of the data voltage charged to the liquid crystal cells of (4k+2)th lines Line#2, Line#6, . . . in the 2Nth frame period.

The timing controller 71 generates the polarity control signal POL, whose a phase is inverse to a phase of the polarity control signal POL in the (N+2)th frame period, in a (2N+2)th frame period. The polarity control signal POL sequentially goes through high, low, high, and high logic states during 4 horizontal periods in the (2N+2)th frame period. Accordingly, the liquid crystal cells of (4k+3)th lines Line#3, Line#7, . . . in the (2N+2)th frame period are charged to a positive polarity data voltage equal to the polarity of the data voltage charged to the liquid crystal cells of (4k+3)th lines Line#3, Line#7, . . . in the (2N+1)th frame period.

The timing controller 71 generates the polarity control signal POL, whose a phase is inverse to a phase of the polarity control signal POL in the (N+3)th frame period, in a (2N+3)th frame period. The polarity control signal POL sequentially goes through low, high, low, and high logic states during 4 horizontal periods in the (2N+3)th frame period. Accordingly, the liquid crystal cells of (4k+4)th lines Line#4, Line#8, . . . in the (2N+3)th frame period are charged to a positive polarity data voltage equal to the polarity of the data voltage charged to the liquid crystal cells of (4k+4)th lines Line#4, Line#8, . . . in the (2N+2)th frame period. Further, a polarity of the data voltage charged to all the liquid crystal cells during one frame period of the (2N+4)th to (3N−1)th frame periods is different from a polarity of the data voltage charged to all the liquid crystal cells during a next frame period.

The liquid crystal display and the method for driving the same according to the fifth implementation time-divide the liquid crystal cells into the liquid crystal cells of the (4k+1)th lines, the liquid crystal cells of the (4k+2)th lines, the liquid crystal cells of the (4k+3)th lines, and the liquid crystal cells of the (4k+4)th lines, and charge the liquid crystal cells to the data voltage with the same polarity during the two neighboring frame periods throughout four frame periods every N frame periods. Hence, the flicker appearing every N frame periods can be reduced. Further, the liquid crystal display and the method for driving the same according to the third implementation changes a polarity of the data voltage charged to the liquid crystal cells every N frame periods from "++" into "−−" or from "−−" into "++", thereby suppressing the DC drive of the liquid crystal cells. Hence, the stains can be reduced.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display comprising:

a liquid crystal display panel including a plurality of data lines, a plurality of gate lines crossing the data lines, and a plurality of liquid crystal cells;

a data drive circuit that inverts a polarity of a data voltage supplied to the data lines in response to a polarity control signal;

a gate drive circuit that supplies a gate pulse to the gate lines; and a timing controller that generates the polarity control signal and controls the data drive circuit and the gate drive circuit, wherein first to fourth liquid crystal cells of the liquid crystal cells are aligned in a direction of the data line, wherein a logic state of the polarity control signal is inverted every one horizontal period and every one frame period for first to (N−1)th frame periods and (N+I)th to (2N−1)th frame periods, where N is an integer, wherein the first to fourth liquid crystal cells charge a data voltage having a polarity different from a previous polarity for the first to (N−1)th frame periods, and the (N+I)th to (2N−1)th frame periods, wherein the polarity control signal is fixed in a low logic state for an Nth frame period, wherein the first and the third liquid crystal cells charge a negative voltage for the (N−1)th and Nth frame periods, and the second and the fourth liquid crystal cells charge the negative voltage for the Nth and (N+I)th frame periods, and wherein the polarity control signal is fixed in a high logic state for a 2Nth frame period, the first and the third liquid crystal cells charge a positive voltage for the (2N−1)th and 2Nth frame periods, and the second and the fourth liquid crystal cells charge the positive voltage for the 2Nth and a (2N+I)th frame periods.

2. The liquid crystal display of claim 1, wherein a logic state of the polarity control signal is inverted every one horizontal period in order of high, low, high, and low logic states in odd-numbered frame periods of the first to (N−1)th frame periods, and the logic state of the polarity control signal is inverse in each horizontal period in order of low, high, low, and high logic states in even-numbered frame periods of the first to (N−1)th frame periods, and wherein the logic state of the polarity control signal is inverted every one horizontal period in order of high, low, high, and low logic states in the (N+I)th frame period, a phase of the polarity control signal is inverted in each of the (N+I)th to (2N−1)th frame periods, and the polarity control signal is in the high logic state during the 2Nth frame period.

3. A liquid crystal display comprising:

a liquid crystal display panel including a plurality of data lines, a plurality of gate lines crossing the data lines, and a plurality of liquid crystal cells;

a data drive circuit that inverts a polarity of a data voltage supplied to the data lines in response to a polarity control signal;

a gate drive circuit that supplies a gate pulse to the gate lines; and a timing controller that generates the polarity control signal and controls the data drive circuit and the gate drive circuit, wherein first to fourth liquid crystal cells of the liquid crystal cells are aligned in a direction of the data line, wherein a logic state of the polarity control signal is inverted every one horizontal period and every one frame period for first to (N−1)th frame periods and (N+I)th to (2N−1)th frame periods, where N is an integer, wherein the first to fourth liquid crystal cells charge a data voltage having a polarity different from a previous polarity for the first to (N−1)th frame periods and the (N+I)th to (2N−1)th frame periods, wherein the polarity control signal is inverted every two horizontal periods in order of low, high, high, and low logic states for an Nth frame period, wherein the first liquid crystal cell charges a negative voltage for the (N−1)th and Nth frame periods, the second liquid crystal cell charges a positive voltage for the (N−1)th and Nth frame periods, the third liquid crystal cell charges the positive voltage for the Nth and (N+I)th frame periods and the fourth liquid crystal cell charges the negative voltage for the Nth and (N+I)th frame periods, and wherein the polarity control signal is inverted every two horizontal periods in order of high, low, low, and high logic states for an 2Nth frame period, the first liquid crystal cell charges the positive voltage for the (2N−1)th and 2Nth frame periods, the second liquid crystal cell charges the negative voltage for the (2N−1)th and 2Nth frame periods, the third liquid crystal cell charges the negative voltage for the 2Nth and an (2N+I)th frame periods and the fourth liquid crystal cell charges the positive voltage for the 2Nth and (2N+I)th frame periods.

4. A liquid crystal display comprising:

a liquid crystal display panel including a plurality of data lines, a plurality of gate lines crossing the data lines, and a plurality of liquid crystal cells;

a data drive circuit that inverts a polarity of a data voltage supplied to the data lines in response to a polarity control signal;

a gate drive circuit that supplies a gate pulse to the gate lines; and a timing controller that generates the polarity control signal and controls the data drive circuit and the gate drive circuit, wherein first to fourth liquid crystal cells of the liquid crystal cells are aligned in a direction of the data line, wherein a logic state of the polarity control signal is inverted every one horizontal period and every one frame period for first to (N−1)th frame periods and (N+I)th to (2N−1)th frame periods, where N is an integer, wherein the first to fourth liquid crystal cells charge a data voltage having a polarity different from a previous polarity for the first to (N−1)th frame periods and the (N+I)th to (2N−1)th frame periods, wherein the polarity control signal is inverted every two horizontal periods in order of low, low high, and high logic states for an Nth frame period, wherein the first liquid crystal cell charges a negative voltage for the (N−1)th and Nth frame periods, the second liquid crystal cell charges the negative voltage for the Nth and (N+I)th frame periods, the third liquid crystal cell charges a positive voltage for the Nth and (N+I)th frame periods and the fourth liquid crystal cell charges the positive voltage for the (N−1)th and Nth frame periods, wherein the polarity control signal is inverted every two horizontal periods in order of high, high, low, and low logic states for an 2Nth frame period, and wherein the first liquid crystal cell charges the positive voltage for the (2N−1)th and 2Nth frame periods, the second liquid crystal cell charges the positive voltage for the 2Nth and an (2N+I)th frame periods, the third liquid crystal cell charges the negative voltage for the 2Nth and (2N+I)th frame periods, and the fourth liquid crystal cell charges the negative voltage for the (2N−1)th and 2Nth frame periods.

5. A liquid crystal display comprising:

a liquid crystal display panel including a plurality of data lines, a plurality of gate lines crossing the data lines, and a plurality of liquid crystal cells;

a data drive circuit that inverts a polarity of a data voltage supplied to the data lines in response to a polarity control signal;

a gate drive circuit that supplies a gate pulse to the gate lines; and a timing controller that generates the polarity control signal and controls the data drive circuit and the gate drive circuit, wherein first to sixth liquid crystal cells of the liquid crystal cells are aligned in a direction of the data line, wherein a logic state of the polarity control signal is inverted every one horizontal period and every one frame period for first to (N−1)th frame periods and (N+2)th to (2N−1)th frame periods, where N is an integer, wherein the first to sixth liquid crystal cells charge a data voltage having a polarity different from a previous polarity for the first to (N−1)th frame periods and an (N+3)th to the (2N−1)th frame periods, wherein the polarity control signal is inverted every three horizontal periods in order of low, low, high, high, high, and low logic states for an Nth frame period, wherein the first liquid crystal cell charges a negative voltage for the (N−1)th and Nth frame periods, the second liquid crystal cell charges the negative voltage for the Nth and an (N+I)th frame periods, the third liquid crystal cell charges the negative voltage for the (N+I)th and (N+2)th frame periods, the fourth liquid crystal cell charges a positive voltage for the (N−1)th and Nth frame periods, the fifth liquid crystal cell charges the positive voltage for the Nth and (N+I)th frame periods, and the sixth liquid crystal cell charges the positive voltage for the (N+1)th and (N+2)th frame periods, wherein the polarity control signal is inverted every three horizontal periods in order of high, high, low, low, low, and high logic states for an 2Nth frame period, and wherein the first liquid crystal cell charges the positive voltage for the (2N−1)th and 2Nth frame periods, the second liquid crystal cell charges the positive voltage for the 2Nth and an (2N+I)th frame periods, the third liquid crystal cell charges the positive voltage for the (2N+I)th and an (2N+2)th frame periods, the fourth liquid crystal cell charges the negative voltage for the (2N−1)th and 2Nth frame periods, the fifth liquid crystal cell charges the negative voltage for the 2Nth and (2N+I)th frame periods, and the sixth liquid crystal cell charges the negative voltage for the (2N+I)th and (2N+2)th frame periods.

6. The liquid crystal display of claim 5, wherein a logic state of the polarity control signal is inverted in order of high, low, low, low, high, and high logic states during 6 horizontal periods in the (N+1)th frame period, and wherein the polarity control signal is inverted in order of low, high, high, high, low, and low logic states during 6 horizontal periods in the (2N+1)th frame period.

7. A liquid crystal display comprising:

a liquid crystal display panel including a plurality of data lines; a plurality of gate lines crossing the data lines, and a plurality of liquid crystal cells;

a data drive circuit that inverts a polarity of a data voltage supplied to the data lines in response to a polarity control signal;

a gate drive circuit that supplies a gate pulse to the gate lines; and a timing controller that generates the polarity control signal and controls the data drive circuit and the gate drive circuit, wherein first to fourth liquid crystal cells of the liquid crystal cells are aligned in a direction of the data line, wherein a logic state of the polarity control signal is inverted every one horizontal period and every one frame period for first to (N−1)th frame periods and (N+3)th to (2N−1)th frame periods, where N is an integer, wherein the first to sixth fourth liquid crystal cells charge a data voltage having a polarity different from a previous polarity for the first to (N−1)th frame periods and the (N+3)th to (2N−1)th frame periods, wherein the polarity control signal is inverted every two horizontal periods in order of low, low, high, and low logic states for an Nth frame period, and in order of high, low, low, and high logic states for an (N+I)th frame period, and then in order of low, high, low, and low logic states for an (N+2)th frame period, wherein the first liquid crystal cell charges a negative voltage for the (N−1)th and an Nth frame periods, the second liquid crystal cell charges the negative voltage for the Nth and (N+I)th frame periods, the third liquid crystal cell charges the negative voltage for the (N+I)th and (N+2)th frame periods, and the fourth liquid crystal cell charges a data voltage having a polarity different from a previous polarity for the first to (N+2)th frame periods, wherein the polarity control signal is inverted every two horizontal periods in order of high, high, low, and high logic states for an 2Nth frame period, and in order of low, high, high, and low logic states for an (2N+I)th frame period, and then in order of high, low, high, and high logic states for an (2N+2)th frame period, and wherein the first liquid crystal cell charges a positive voltage for the (2N−1)th and 2Nth frame periods, the second liquid crystal cell charges the positive voltage for the 2Nth and (2N+I)th frame periods, the third liquid crystal cell charges the positive voltage for the (2N+I)th and (2N+2)th frame periods, and the fourth liquid crystal cell charges a data voltage having a polarity different from a previous polarity for the first to (2N−1)th to (2N+2)th frame periods.

* * * * *